May 22, 1928. Re. 16,974

H. E. MUCHNIC

RAILWAY CROSSING STRUCTURE

Original Filed Nov. 14, 1923

Witness:
Geo. E. Lonsen

Inventor
Henry E. Muchnic
By Attorney
Paul Carpenter

Reissued May 22, 1928. Re. 16,974

UNITED STATES PATENT OFFICE.

HENRY E. MUCHNIC, OF ATCHISON, KANSAS.

RAILWAY-CROSSING STRUCTURE.

Original No. 1,551,164, dated August 25, 1925, Serial No. 674,638, filed November 14, 1923. Application for reissue filed April 21, 1927. Serial No. 185,605.

This invention relates to improvements in railway crossing structures, and is a modification of the structure originally shown and claimed in my prior Patent 1,154,534, patented September 21, 1915.

In the present form I have provided approach plates coactable with the outside of the rails of a track and an intermediate plate constructed to bridge the space between the rails, these elements being varied in form and arrangement to accommodate various track layouts. In the present embodiment, I have constructed my plates to permit securing of the intermediate plate in position between the rails without spikes or other through fastening means, permitting disposition of the plate without regard to the location of the cross-ties, which is necessary where through spikes or the like are used.

Another object of my invention is to provide a structure of this character which may be positioned without interference from the rail joints or tie-plates, this being accomplished by the provision of integral lugs which may be knocked or chipped off from the supporting flanges.

Another object consists in the provision of an approach plate which will interlock with or engage a track rail so that with the assistance of ordinary spikes driven in the ties at the side of the plate opposite to the rail the approach plate may be held securely in position.

The purpose of these plates is to carry a roadway or other crossing over a track in such wise that access to the track or roadbed may be readily had in order to permit the crossing of the track to be laid with a minimum of expense and labor, eliminating the use of planks, concrete or the like, now in general use.

Figure 1:
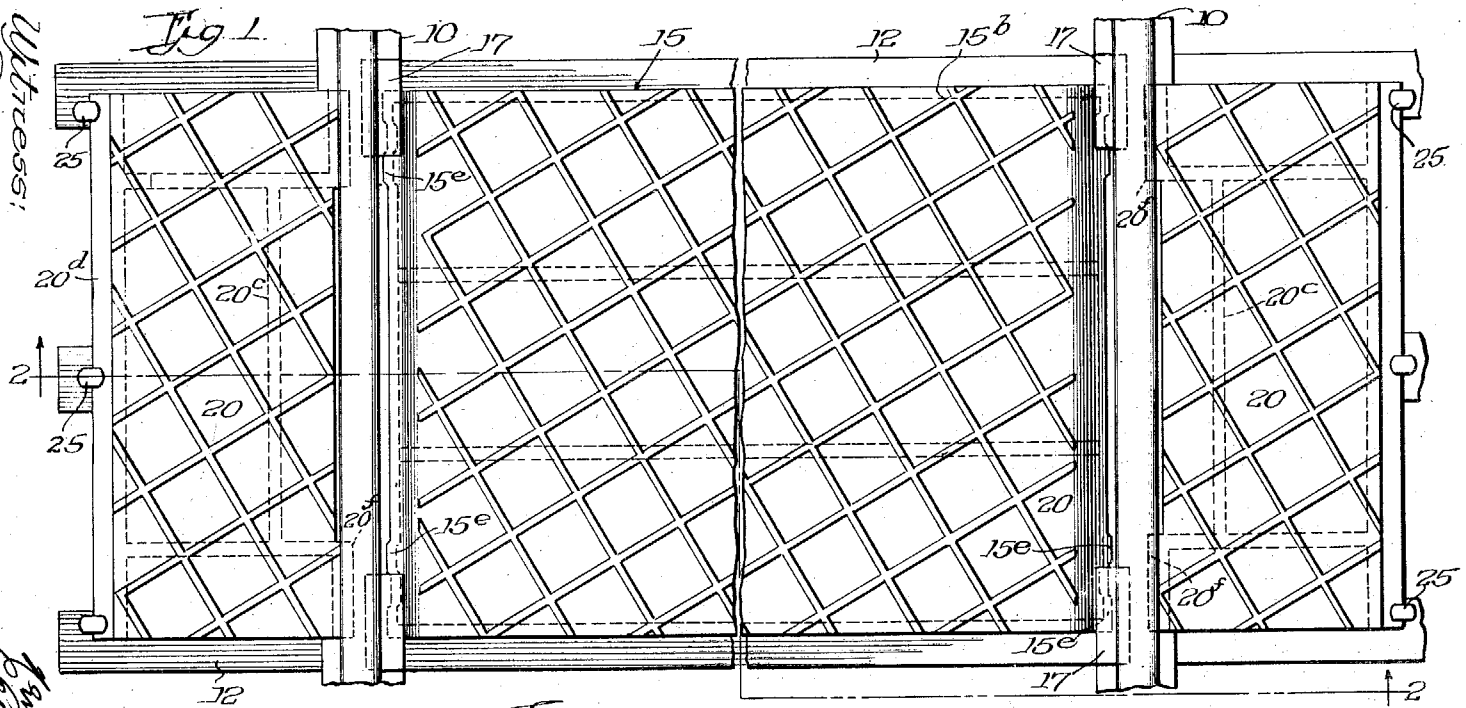

These and other objects will be more fully set forth and described in the following specification and shown in the accompanying drawing, in which Figure 1 is a plan view showing my railway crossing as applied to a single track.

Figure 2:
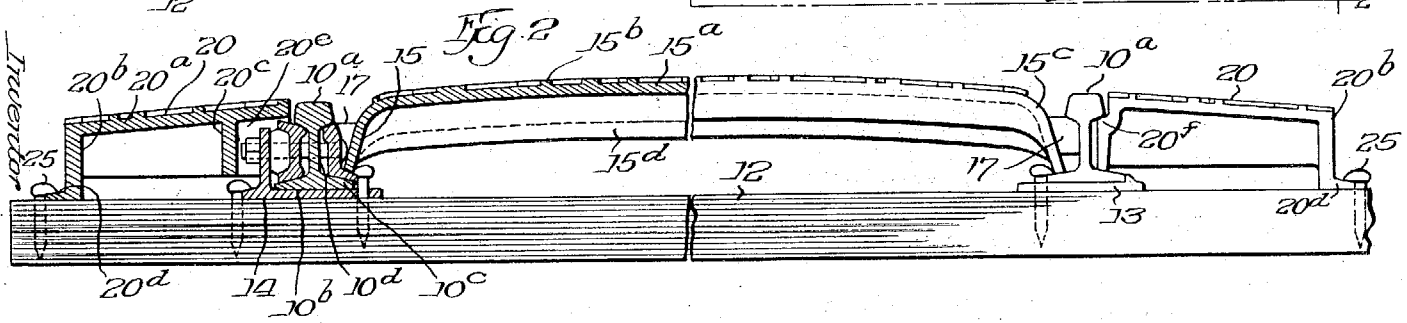

Figure 2 is a vertical section along line 2—2 of Figure 1.

In the drawings, 10 designates, generally, the ordinary T-shaped rails having the head portions $10^a$ and the base flanges $10^b$ and $10^c$ extending to outside of the central web $10^d$. These rails 10 are carried on the usual transverse sleepers or ties 12. In the form shown, the track is secured to ties 12 by tieplates 13 of conventional construction, and I have illustrated such a rail joint, generally indicated by numeral 14, also of conventional construction, and including a chair or tie plate member.

Extending between the rails 10 is the intermediate plate member, generally indicated by numeral 15, and comprising a body or supporting portion $15^a$ provided with cross ribs or corrugations $15^b$ to eliminate danger of slipping. Extending downwardly and outwardly from the upper supporting portions $15^a$ are the side flanges $15^c$. Between the side flanges and formed integral therewith and with the upper portion $15^a$ are the strengthening ribs $15^d$ serving to strengthen and re-inforce the structure. At their supporting edges the flanges $15^c$ are provided with lugs $15^e$ (see Figure 1) which may be broken or chipped off, as desired, thus permitting the flanges to rest upon the base of the rails without interference from rail joints or tie plate members, the lugs being broken away to accommodate such members, as shown, for example, in Figure 2.

To secure the intermediate plate 15 between the rails, I provide wedges or filler blocks 17 of wood, or the like, which may be slid longitudinally of the rail into position beneath the head of the rail, these members 17 coacting with the rail heads and the flanges $15^c$ to prevent vertical displacement of the supporting plate 15, the lugs $15^e$ preventing movement longitudinally of the track.

In use with a single track, as shown in the drawing, I provide an approach plate 20 at the outer side of each rail, these approach plates being provided with the upper corrugated supporting surfaces $20^a$ and the vertical depending flanges $20^b$ and $20^c$, the former having an angularly directed base plate $20^d$. Intermediate the ends of the approach plate 20 the flange $20^c$ is inset to provide a recess $20^e$ for the accommodation of the rail joint or similar member. At the sides of the recess $20^e$ the flanges $20^c$ is projected outwardly of the plate 20 to fit beneath and engage the rail head $10^a$, as indicated at $20^f$. The portions $20^f$ of flange $20^c$ are continued downwardly to rest upon the base plate of a rail and are maintained in position by spikes 25 or the like engaging the portions $20^d$ of flanges $20^b$ to prevent outward displacement should the roadway fail to prevent such displacement.

It will be obvious by the structure above described that I am enabled to provide a strong crossing between and at the sides of a track which may be economically constructed of cast iron and which is capable of being quickly removed for replacement or access to the roadbed in contra-distinction to planks, concrete, or the like now generally used. It will also be apparent that these plate members may be laid without interference from the rail joint, tie-plates, or the like, thus permitting ready application to existing trackways.

I do not wish to be restricted to the form shown and described, except as defined in the appended claims.

What I claim is:

1. In combination with a pair of rails, a plate member extending therebetween, said plate having depending supporting flanges, and wedge members inserted between each rail and the adjacent flange.

2. In combination with a pair of rails, a plate member extending therebetween, said plate having depending outwardly inclined supporting flanges, and wedge members inserted between each of said rails and the adjacent flange.

3. An article of manufacture comprising a railway crossing plate having an upper supporting portion, and depending supporting flanges, said flanges being provided with removable lugs at their supporting edges.

4. In combination with a pair of rails having base flanges, and a plate member extending between said rails, said plate member having depending supporting flanges resting upon said rail flanges, and members coacting with said rails and said plate members to prevent vertical displacement of said plate members.

5. In combination with a pair of rails having base flanges, and a plate member extending between said rails, said plate member having depending supporting flanges resting upon said rail flanges, and means coacting with said rails and said plate members to prevent vertical displacement of said plate members, said last named means comprising wedges located beneath the heads of said rails.

6. In combination with a track rail, a crossing plate arranged to have its upper surface substantially at the same level with the rail head, said plate being formed to engage the rail against vertical and lateral displacement, including a downwardly disposed supporting flange formed with a recessed portion to fit beneath the head of said rail and braced at one edge thereof.

7. In combination with a track rail, a crossing plate arranged to have its upper surface substantially at the same level with the rail head, said plate being formed with a portion to engage the rail against vertical and lateral displacement, including a downwardly disposed supporting flange wedged between the rail head and the base flange thereof.

8. In combination with a track rail, a crossing plate arranged to have its upper surface substantially at the same level with the rail head, said plate being formed to engage the rail against vertical and lateral displacement comprising a downwardly disposed flange including a rail head engaging portion and a base flange engaging portion adapted to ride upon the inclined face of said rail base flange to brace the plate flange between said rail head and base flange and forming the sole support at one side of said plate, and means for anchoring the opposite end of said plate.

9. In combination with a track rail, a crossing plate arranged to have its upper surface substantially at the same level with the rail head, means for engaging the rail to hold one end of said plate against vertical and lateral displacement comprising a downwardly disposed flange including a rail head engaging portion and a base flange engaging portion, adapted to ride upon the inclined face of said rail base flange to brace the flange between said rail head and base flange, and means for anchoring the opposite end of said plate said downwardly disposed flange and end forming the sole supporting means for said plate.

10. In combination with a track rail, a crossing plate arranged to have its upper surface substantially at the same level with the rail head, means for engaging the rail to hold one end of said plate against vertical and lateral displacement comprising a flange including a rail head engaging portion and a base flange engaging portion adapted to be positioned by pivotally moving the same upon the inclined face of said rail base flange to brace the flange between said rail head and base flange, and means for anchoring the opposite end of said plate said base flange engaging portion and end forming the sole supporting means for said plate.

11. In combination with a pair of rails, a plate member extending therebetween, said plate members having at one edge thereof a downwardly depending supporting flange adapted to be positioned upon the base flange of said rail and means for holding said edge against vertical and lateral displacement by movement of said edge along the inclined base flange of said rail said means being disposed to engage said rail head.

12. In combination with a pair of rails, a plate member extending therebetween, said plate members having at one edge thereof a downwardly depending supporting flange adapted to be positioned upon the base flange of said rail and tensioning means for holding said edge against vertical and lateral displacement by movement of said edge along the inclined base flange of said rail, comprising a wedge block at the opposite edge of said plate.

13. In combination with a railway track rail, a plate adapted to form a continuous crossing thereover, said plate having at one edge thereof a downwardly depending supporting flange adapted to be positioned upon the base flange of said rail for engagement between said base flange and rail head, and means for holding said edge against vertical and lateral displacement by movement of said edge along the inclined base flange of said rail.

14. In combination with a railway track rail, a plate adapted to form a continuous crossing thereover, said plate having at one edge thereof a downwardly depending supporting flange adapted to be positioned upon the base flange of said rail for engagement between said base flange and rail head, and means for holding said edge against vertical and lateral displacement by movement of said edge along the inclined base flange of said rail, and anchoring means at the opposite edge of said plate for causing said movement.

In testimony whereof I have hereunder set my hand.

HENRY E. MUCHNIC.